US008566018B2

(12) United States Patent
Filias

(10) Patent No.: US 8,566,018 B2

(45) Date of Patent: Oct. 22, 2013

(54) PILOTING ASSISTANCE METHOD FOR AIRCRAFT

(75) Inventor: Francois-Xavier Filias, Pelissanne (FR)

(73) Assignee: Eurocopter, Marignane Cedex (FR)

( * ) Notice: Subject to any disclaimer, the term of this patent is extended or adjusted under 35 U.S.C. 154(b) by 141 days.

(21) Appl. No.: 13/176,912

(22) Filed: Jul. 6, 2011

(65) Prior Publication Data

US 2012/0016580 A1 Jan. 19, 2012

(30) Foreign Application Priority Data

Jul. 16, 2010 (FR) ..................................... 10 02991

(51) Int. Cl.

*B64D 43/00* (2006.01)
*G06F 19/00* (2011.01)
*G01C 21/16* (2006.01)
*G01S 5/00* (2006.01)

(52) U.S. Cl.

USPC ............................................... 701/301; 701/3

(58) Field of Classification Search

USPC .............................................. 701/301, 213, 3

See application file for complete search history.

(56) References Cited

U.S. PATENT DOCUMENTS

| | | | | |
|---|---|---|---|---|
| 3,245,076 | A | 4/1966 | Tilly | |
| 3,936,796 | A * | 2/1976 | Bateman | 340/970 |
| 4,030,065 | A * | 6/1977 | Bateman | 340/970 |
| 4,737,788 | A * | 4/1988 | Kennedy | 342/29 |
| 5,892,462 | A | 4/1999 | Tran | |
| 5,946,926 | A * | 9/1999 | Hartman | 62/201 |
| 6,216,065 | B1 * | 4/2001 | Hall et al. | 701/16 |
| 6,317,690 | B1 | 11/2001 | Gia | |
| 6,347,263 | B1 * | 2/2002 | Johnson et al. | 701/14 |
| 6,502,015 | B1 * | 12/2002 | Brookes et al. | 701/3 |
| 6,622,066 | B2 * | 9/2003 | Ishihara et al. | 701/9 |
| 7,428,451 | B2 * | 9/2008 | Artini et al. | 701/9 |
| 7,499,773 | B2 * | 3/2009 | Pire et al. | 701/3 |
| 7,633,430 | B1 | 12/2009 | Wichgers | |
| 2002/0188386 | A1 * | 12/2002 | Day | 701/4 |
| 2003/0195672 | A1 | 10/2003 | He | |
| 2006/0235581 | A1 | 10/2006 | Petillon | |

(Continued)

FOREIGN PATENT DOCUMENTS

| | | | |
|---|---|---|---|
| EP | 0652544 | A1 | 5/1995 |
| FR | 1374954 | A | 10/1964 |

(Continued)

OTHER PUBLICATIONS

Search Report and Written Opinion; Application No. FR 1002991 dated Mar. 7, 2011.

*Primary Examiner* — Mary Cheung
*Assistant Examiner* — Michael Berns
(74) *Attorney, Agent, or Firm* — Brooks Kushman P.C.

(57) ABSTRACT

The present invention relates to a piloting assistance method for an aircraft, the method consisting in using data from at least one active telemeter sensor (A) in order to construct a sensor safety cordon (B) for avoiding the terrain and obstacles that are overflown. The method;

defines and calculates angular sectors (w) over the field of regard facing the pilot;

constructs a terrain safety cordon (D) using at least one terrain database (C);

for at least some of the angular sectors (w), constructs a hybrid safety cordon (E) that, in each of the angular sectors (w) in question, makes use of the higher of the sensor and terrain safety cordons (B, D); and displays one of the cordons selected from: the hybrid safety cordon (E), the terrain safety cordon (D), and the sensor safety cordon (B).

10 Claims, 4 Drawing Sheets

(56) References Cited

U.S. PATENT DOCUMENTS

| | | | | |
|---|---|---|---|---|
| 2007/0290918 | A1* | 12/2007 | Filias et al. | 342/29 |
| 2008/0243383 | A1 | 10/2008 | Lin | |
| 2008/0281522 | A1* | 11/2008 | Subelet | 701/301 |
| 2011/0130895 | A1* | 6/2011 | Gillet et al. | 701/4 |

FOREIGN PATENT DOCUMENTS

| | | | |
|---|---|---|---|
| FR | 2658636 | A1 | 8/1991 |
| FR | 2712251 | A1 | 5/1995 |
| FR | 2886439 | A1 | 12/2006 |

* cited by examiner

PILOTING ASSISTANCE METHOD FOR AIRCRAFT

CROSS REFERENCE TO RELATED APPLICATIONS

This application claims the benefit of FR 10 02991 filed on Jul. 16, 2010, the disclosure of which is incorporated in its entirety by reference herein.

BACKGROUND OF THE INVENTION (1) Field of the Invention

The invention relates to the general technical field of providing piloting assistance for aircraft flying at low altitude. In this kind of flight configuration, often close to obstacles and to the ground, it is necessary to have safety margins that are reliable when a pilot is following a path manually or with the help of an autopilot system. These margins, which are representative of the distance between the aircraft and the terrain, are displayed on a screen, e.g. in the form of a safety cordon, and they are absolutely essential, particularly when flying in low visibility.

The present invention relates more particularly to flying at low altitude and more precisely to following terrain at varying altitudes on a continuous basis, with an aircraft such as a rotorcraft, e.g. a helicopter, in order to avoid colliding with the terrain or with obstacles.

The following conventional abbreviations are used below:

Lidar (light detection and ranging);

Radar (radio detection and ranging);

AHRS (attitude and heading referential system);

GPS (global positioning system);

GNSS (global navigation satellite system), a term covering any satellite positioning system, including the global positioning system (GPS);

FOR (field of regard), measured in terms of the aperture angle of the acquisition window;

MSL (mean sea level);

WGS (world geodetic system);

HFoM (horizontal figure of merit), i.e. position error in the horizontal plane; and VFoM (vertical figure of merit), i.e. position error in the vertical plane.

Furthermore, during a medical evacuation or when flying at low altitude under cloud cover, helicopters attempt to fly as close as possible to the terrain, while avoiding colliding therewith. In order to perform contour flying at low altitude, while avoiding collisions with the terrain, helicopter pilots fly under visual flight rules (VFR). Known means enable this type of mission to be performed, providing visibility is good, or else in poor visibility, but at altitudes that are not appropriate for all missions. Such altitudes are generally related to information in a terrain database in which potential obstacles are referenced.

(2) Description of Related Art

At present, two families of solutions are known for performing low altitude flying, while remaining as close as possible to the terrain and while avoiding obstacles.

One of the families relates to methods using terrain databases (elevation relative to a reference geoid (e.g. MSL or WGS84)), possibly together with databases of obstacles (geo-located together with their heights above the ground). Those methods are strongly dependent on geo-location means. For example, losing a GNSS system presents a major drawback for continuing a mission under initial conditions. Furthermore, there is the problem of lack of accuracy in "terrain" databases. Obstacles such as cables are not always accurately identified. In order to comply with flight safety margins, the helicopter is thus constrained to fly at an altitude that is too high relative to the relief.

Another family relates to methods making use of active telemeter sensors. Those methods present the drawback of not making it possible to anticipate turns that need to be performed and of not providing any predictive aspect concerning the path to be followed over the long term. One method making use of active telemeter sensors is described for example in Document FR 2 886 439. The method described nevertheless requires flight to be performed at high altitude when visibility is poor. That method also suffers from wave-reflection problems of the kind that are inherent to telemeter sensors.

In addition, such methods are very dependent on the quality of the telemeter sensor used. For example, such sensors have varying ranges (from 500 meters (m) to 2000 m), with cables being detected in Lidar mode, but not necessarily in Radar mode, and with other obstacles being detected regardless of the weather in Radar mode, but not in Lidar mode. Such methods thus increase the stress and the workload on the pilot.

Document U.S. Pat. No. 3,245,076 discloses an autopilot system enabling a safety curve to be determined at a distance from the aircraft, and more precisely with the help both of its speed vector, and of a distance corresponding to the minimum distance that must be maintained between the aircraft and detected relief. The system described also determines upper and lower curves located on either side of the safety curve. As a function of the appearance of obstacles that are referenced positively or negatively relative to the safety curve, between the lower and upper curves, the system calculates angles for pointing the nose down or up that are compatible with the maneuverability of the aircraft.

Document FR 2 712 251 describes a method of assisting the piloting of an aircraft for flying at low altitude, which method consists in detecting dangerous obstacles in relief. The method is based in particular on the maneuvering capability of the aircraft, on the basis of which a fictitious or potential curve is calculated that is tied to the aircraft and that is associated with an optimum theoretical path for overflying an obstacle in a vertical plane. That optimum theoretical overflight path is recalculated in each angular sector of the FOR while taking into consideration its highest obstacle, e.g. as detected by a telemeter sensor.

Document FR 1 374 954 describes associating a radar and a computer to operate continuously to determine the situation of an aerodyne relative to the ground and to issue nose-down or nose-up orders.

In addition to the Documents FR 2 886 439, U.S. Pat. No. 3,245,076, FR 2 712 251 (=EP 0 652 544), and FR 1 374 954, other documents may be mentioned.

Thus, Document U.S. Pat. No. 5,892,462 describes an adaptive type system for avoiding collision with terrain. Parameters are taken into account from various sources in order to consolidate a terrain-avoiding algorithm, those parameters including telemeter measurements or map-based data, but without seeking to construct a safety cordon over angular sectors.

Document US 2008/0243383 describes a terrain collision avoiding system that incorporates parameters from various sources.

Document U.S. Pat. No. 7,633,430 describes a terrain awareness warning system (TAWS) for aircraft, which system incorporates various parameters including on-board radar returns.

Document US 2003/195672 describes a flight management system including an augmented three-dimensional (3D) display of terrain.

Documents US 2006/0235581, FR 2 658 636, U.S. Pat. No. 6,317,690, and US 2008/243383 may be considered.

When a telemeter sensor is used, known methods are also highly dependent on the quality of the telemeter sensor and are unsuitable for mitigating any failure of said telemeter sensor. The pilot may thus be in a situation in which it is not possible to use a safety cordon, either because it is not available, or else because it is degraded by data that is wrong or inaccurate. The methods described also require flying to take place a high altitude when visibility is poor.

Problems of wave reflections that are inherent to telemeter sensors are not overcome by using said methods.

All of the measurements from geo-locating means are often not taken into account at present, in particular the measurement errors delivered by GNSS means such as HFoM or VFoM giving information about horizontal and vertical measurement errors are often not taken into account when calculating a path for low altitude flights.

SUMMARY OF THE INVENTION

An object of the invention is to propose piloting assistance that does not present the above-mentioned drawbacks.

Another object of the invention is to propose piloting assistance that is particularly well adapted to rotorcraft in general and to helicopters in particular.

Yet another object of the invention is to propose piloting assistance that is particularly useful for flying close to the terrain and to obstacles, without degrading the safety margins in flight.

These objects are achieved by the present invention, which is defined by the claims.

In particular, these objects are achieved with the help of a technical method for providing an aircraft with piloting assistance, the method using data from at least one active telemeter sensor in order to construct a sensor safety cordon for avoiding the terrain and the obstacles that are being overflown. To do this, this implementation makes provision for:

- defining and calculating angular sectors over the field of regard facing the pilot;
- constructing a terrain safety cordon using at least one terrain database;
- for at least some of the angular sectors, constructing a hybrid safety cordon that, in each of the angular sectors in question, makes use of the higher of the sensor and terrain safety cordons; and
- displaying one of the cordons selected from: the hybrid safety cordon, the terrain safety cordon, and the sensor safety cordon.

In an implementation, the method in accordance with the invention makes provision for displaying the terrain safety cordon in at least a first mode of operation.

In an implementation, the method in accordance with the invention makes provision for displaying a hybrid safety cordon in a second mode of operation.

In an implementation, the method in accordance with the invention makes provision for displaying a hybrid terrain-tracking cordon in at least a third mode of operation, said hybrid terrain-tracking cordon being constructed using the sensor safety cordon and the terrain safety cordon in the event of measurements from the active telemeter sensor being absent or lost or in the event of a field of regard not being covered by said active telemeter sensor.

In an implementation, the method in accordance with the invention makes provision for displaying a sensor safety cordon in at least one additional mode of operation.

In an implementation, the method in accordance with the invention makes provision, when the sensor safety cordon and the terrain safety cordon are free from construction errors, for selecting the mode of operation from the first and second modes of operation.

In an implementation, the method in accordance with the invention makes provision, when the sensor safety cordon and the terrain safety cordon are free from construction errors, for selecting the mode of operation from the first, second, and third modes of operation.

In an implementation, the method in accordance with the invention makes provision for verifying the operating state of locating means and the integrity of the terrain database used for establishing the terrain safety cordon, for verifying the operating state of the active telemeter sensor and of the GNSS/AHRS system used for establishing the sensor safety cordon, for displaying the sensor safety cordon in the event of a failure of the locating means or of corruption of the terrain database, and for displaying a terrain alarm in the event of a failure of the locating means or corruption (absence) of the terrain database together with a failure of the active telemeter sensor.

In an implementation, the method in accordance with the invention makes provision for verifying the operating state of locating means and the integrity of the terrain database used for establishing the terrain safety cordon, for verifying the operation of the active telemeter sensor and of the GNSS/AHRS system used for establishing the sensor safety cordon, and for displaying the terrain safety cordon in the event of the active telemeter sensor or the GNSS/AHRS system failing.

In an implementation, the method in accordance with the invention makes provision for using a state vector representing information coming from on-board navigation sensors, in order to construct the terrain safety cordon and the sensor safety cordon.

In an implementation, the method in accordance with the invention makes provision for displaying a speed vector symbolizing the aircraft and its position relative to the displayed cordon.

In an implementation, the method in accordance with the invention makes provision for constructing a predictive three-dimensional path for following terrain by using a simulated state vector, the terrain database, and a two-dimensional route plotted by the pilot.

In an implementation, the method in accordance with the invention makes provision for storing the three-dimensional path together with data relating to the terrain derived from the simulation in such a manner as to cause said path to be followed by an autopilot system.

In an implementation, the method in accordance with the invention makes provision for displaying the terrain safety cordon or the hybrid safety cordon as constructed in real time from the terrain database and the measurements from the active telemeter sensor in order to verify proper operation of the autopilot system.

In an implementation, the method in accordance with the invention makes provision for using a terrain database including an obstacles database.

The invention presents the advantage of being capable of providing a predictive aspect concerning the terrain encountered.

Another advantage of the invention is associated with the possibility, in the event of a failure of the active telemeter sensor, of constructing a safety cordon from a terrain database making up for the loss of measurements from said sensor.

Yet another advantage of the invention is associated with the possibility of anticipating maneuvers when turns need to be made. Because of its range, and because of its FOR, a telemeter sensor does not have the capacity, when turning with high levels of banking, to anticipate elevation above terrain in zones that the aircraft is about to "discover".

An additional advantage of the invention is associated with optical detection being made safe by the active telemeter sensor in the event of the terrain database (with or without an obstacles database) failing or lacking in accuracy. Even cables or other obstacles that are not listed or that are poorly listed in the terrain database are detected, and this enables flying to be made safer.

Because the invention enables a safety cordon to be displayed at any time during a flight for a prerecorded path and in application of cordon-construction constraints, the pilot can usefully verify that the system is operating properly with an autopilot. This verification is performed by inspecting the position of the helicopter speed vector relative to the displayed safety cordon.

The invention enables the pilot to select between different modes of operation. Thus, depending on the nature of a mission or depending on weather conditions, the pilot may select the piloting assistance mode that is the most appropriate for flying at low or very low altitude.

BRIEF DESCRIPTION OF THE DRAWINGS

The invention and its advantages appear in greater detail in the context of the following description of an embodiment given by way of non-limiting illustration and with reference to the accompanying figures, in which.

DETAILED DESCRIPTION OF THE PREFERRED EMBODIMENTS

Elements that are structurally and functionally identical and that are present in more than one of the figures are given the same numerical or alphanumerical references in each of them.

Figure 1:
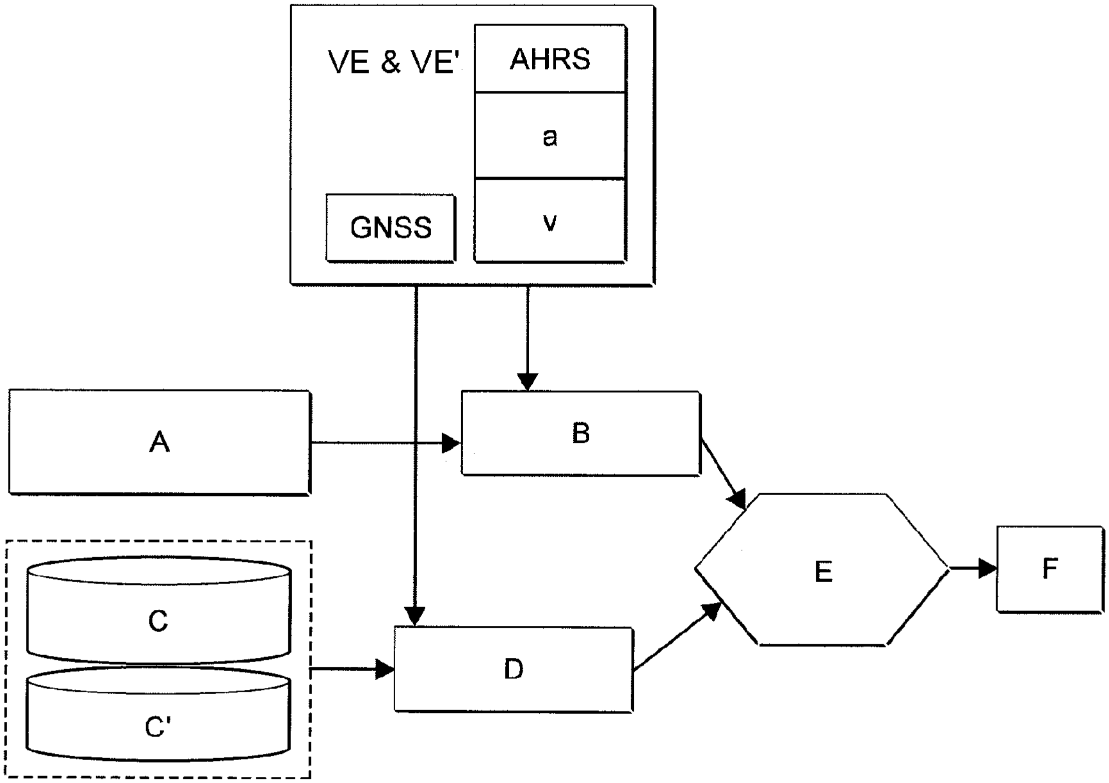
FIG. 1 is a block diagram of an implementation of the piloting assistance method in accordance with the invention.

FIG. 1 is a block diagram showing an implementation of the piloting assistance method in accordance with the invention.

This piloting assistance method for an aircraft makes provision for using measurement data from at least one active telemeter sensor A in order to construct a sensor safety cordon B for avoiding the terrain and obstacles.

In the present description, the term "active telemeter sensor" should be understood broadly and not in limiting manner, covering equally well any means for remotely capturing images, including 3D or stereoscopic images.

The piloting assistance method for an aircraft constructs a terrain safety cordon D with the help of at least one terrain database C. This database includes for example an obstacle database C'.

The terrain safety cordon D and the sensor safety cordon B are constructed by using specific algorithms that are known together with a state vector VE or a simulated state vector VE'. The state vectors VE and VE' are based on all of the navigation parameters such as: acceleration a; speed v; information from the AHRS (attitudes, namely roll, pitching, and yaw); and information from the GNSS (position, namely latitude, longitude, MSL attitude, and horizontal and vertical errors, i.e. HfoM and VFoM).

This technical method also defines and calculates angular sectors W in the FOR facing the pilot.

Thereafter, the method constructs, for at least some of the angular sectors w, a hybrid safety cordon E, which comprises, for each of the angular sectors w in question, the higher of the sensor safety cordon B and the terrain safety cordon D.

Thereafter, this technical method uses a screen F to display one of the cordons comprising the hybrid safety cordon E, the terrain safety cordon D, and the sensor safety cordon B. The displayed cordon is preferably superposed on the angular sectors w of the FOR.

In one implementation, the method of the invention displays the terrain safety cordon D, at least in a first mode of operation M1.

In another implementation, the method of the invention displays the hybrid safety cordon E in a second mode of operation M2.

In yet another implementation, the method of the invention displays a terrain-tracking hybrid cordon ST in at least a third mode of operation M3.

The terrain-tracking hybrid cordon ST is constructed using the technical method from the sensor safety cordon B and the terrain safety cordon D in the absence or loss of measurements from the active telemeter sensor A or in the event of an FOR that is not covered by said active telemeter sensor A.

In an implementation of the invention, the technical method displays the sensor safety cordon B in at least one additional mode of operation.

Figure 2:
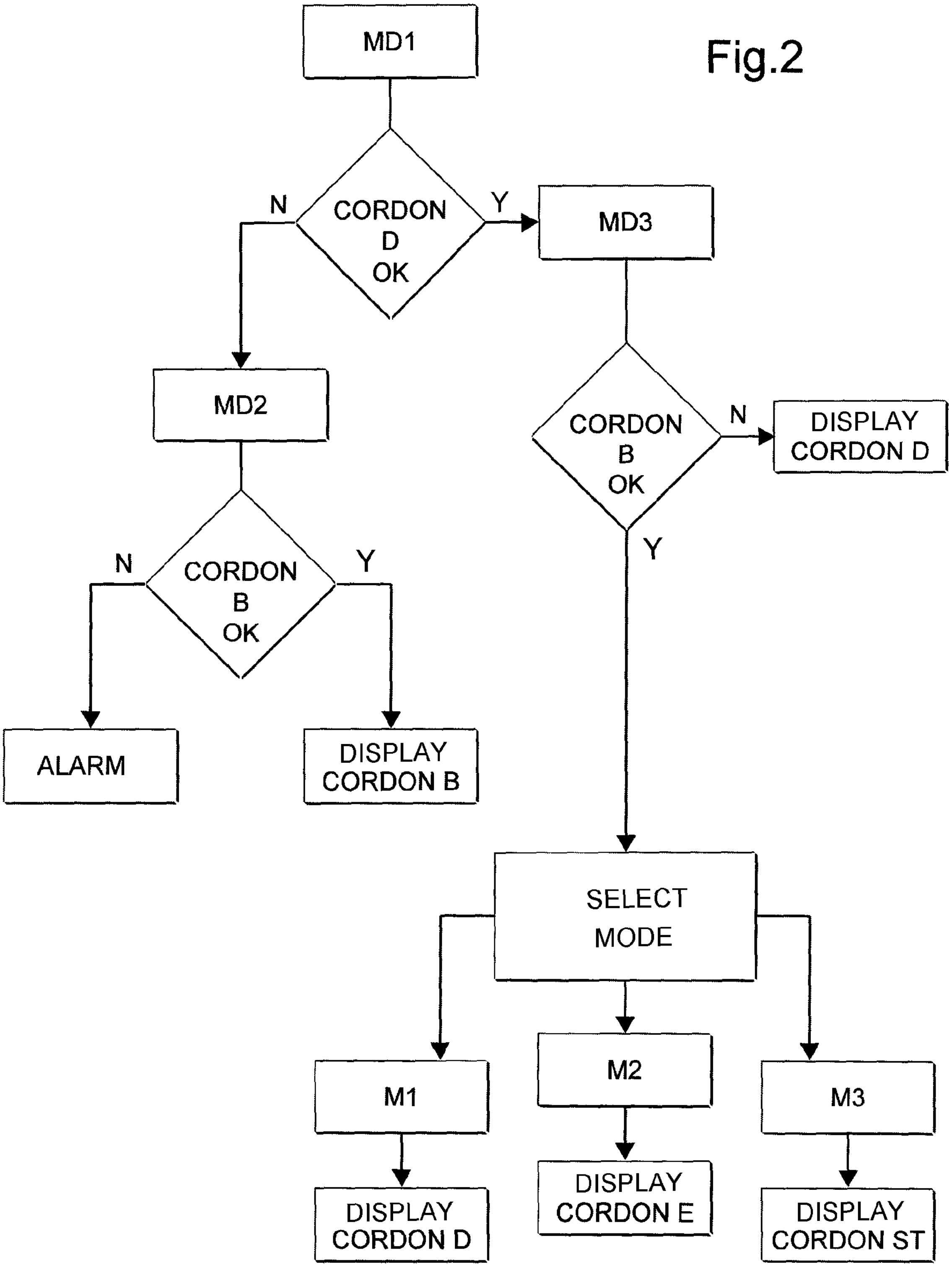
FIG. 2 is a flow chart showing the steps of an implementation of the method in accordance with the invention.

FIG. 2 is a flow chart showing the steps of an implementation of the invention. In this implementation, it is possible for the pilot to select various modes of operation. Which one of these modes is selected depends in particular on the nature of the mission to be performed, on the relief, and on weather conditions.

The method of the invention verifies that the safety cordons B and D are not corrupted with the help of respective detectors means MD1 and MD3. The operation of the cordons is verified as follows:

with an active sensor: if no information is delivered by the sensor or if the data includes a signal indicating erroneous measurements (e.g. false echoes), then the sensor safety cordon is declared invalid; and with a database only: if the initial verification indicates that the database is not sufficiently up to date, not defined for the zone to be overflown, or physically corrupted, then the terrain safety cordon is declared invalid.

In an implementation, when the sensor safety cordon B and the terrain safety cordon D are free from construction errors, then the technical method of the invention selects a mode of operation from the first and second modes of operation M1 and M2.

In another implementation, when the sensor safety cordon B and the terrain safety cordon D are free from construction errors, then the technical method of the invention selects a mode of operation from the first, second, and third modes of operation M1, M2, and M3.

In an implementation of the invention, the technical method verifies the operating state of the GNSS locating means and the integrity of the terrain database C used for establishing the terrain safety cordon D, and verifies the operating state of the active telemeter sensor A and of the GNSS/AHRS system providing assistance in constructing the sensor safety cordon B.

The method in accordance with the invention displays the sensor safety cordon B in the event of the locating means failing or in the event of the terrain database C being corrupt, and it then displays a "terrain" alarm in the event of the locating means failing or the terrain database C being corrupt, together with a failure of the active telemeter sensor A.

In an implementation of the invention, the method in accordance with the invention verifies the operating state of the GNSS locating means and verifies the integrity of the terrain database C used for establishing the terrain safety cordon D, verifies the operation of the active telemeter sensor A, and verifies the operation of the GNSS/AHRS system used for establishing the sensor safety cordon B, and it displays the terrain safety cordon D in the event of the active telemeter sensor A or the GNSS/AHRS system failing.

The method in accordance with the invention uses a state vector VE that represents information coming from the on-board navigation sensors in order to construct the terrain safety cordon D and the sensor safety cordon B.

In an implementation, the method of the invention displays a speed vector V symbolizing the aircraft and its position relative to the displayed cordon and relative to the terrain T, as can be seen in FIGS. 3 to 6.

In another implementation, the method in accordance with the invention constructs a predictive three-dimensional path for tracking terrain by using a two-dimensional route plotted by the pilot, the terrain database C, and a simulated state vector (VE') for the entire route.

In an implementation, the technical method stores the three-dimensional path together with the data relating to terrain derived from the simulation, so as to cause said path to be followed by a piloting system having automatic or manual controls.

For example, the technical method displays the terrain safety cordon D or the hybrid safety cordon E, as constructed in real time from the terrain database C and from measurements performed by the active telemeter sensor A, in order to provide useful and effective verification that the autopilot system is operating properly.

In an implementation, the method uses a terrain database C that includes an obstacle database C'.

Figure 3:
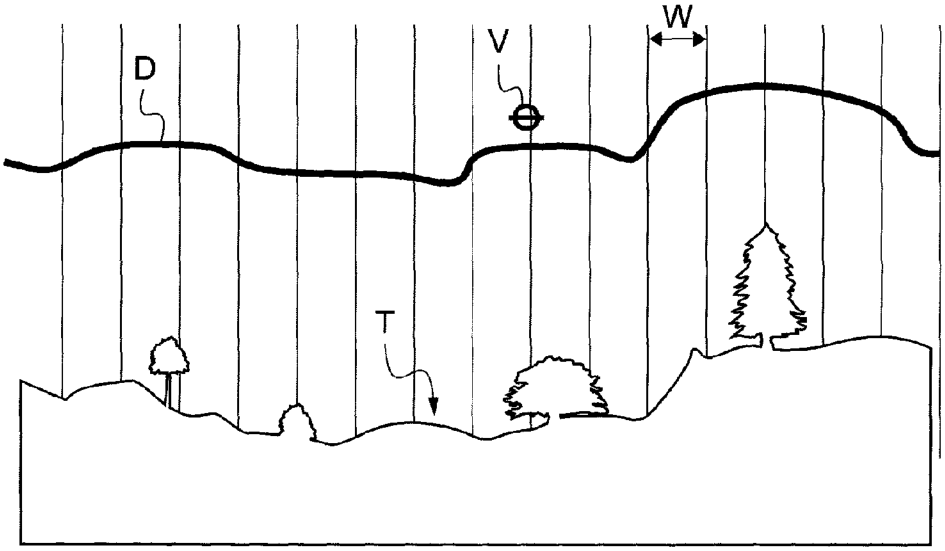
FIG. 3 shows an example of a terrain safety cordon constructed using the method in accordance with the invention and displayed on a screen, said cordon being constructed from at least one terrain and obstacles database.

FIG. 3 represents an example of a terrain safety cordon D constructed using the method in accordance with the invention and displayed on a screen. The terrain safety cordon D is constructed from at least one terrain database C and at least one obstacle database C'. The terrain and the relief T are displayed simultaneously with the terrain safety cordon D. The speed vector v is also displayed.

The terrain database C, where appropriate together with the obstacles database C', also serves to present a given safety level. Smoothing (using a smoothing algorithm) and additions in proportion to error margins delivered by said terrain database C serve to increase the height of the terrain safety cordon D. Information from the GNSS, such as the HFoM or the VFoM may also be used for this purpose.

Figure 4:
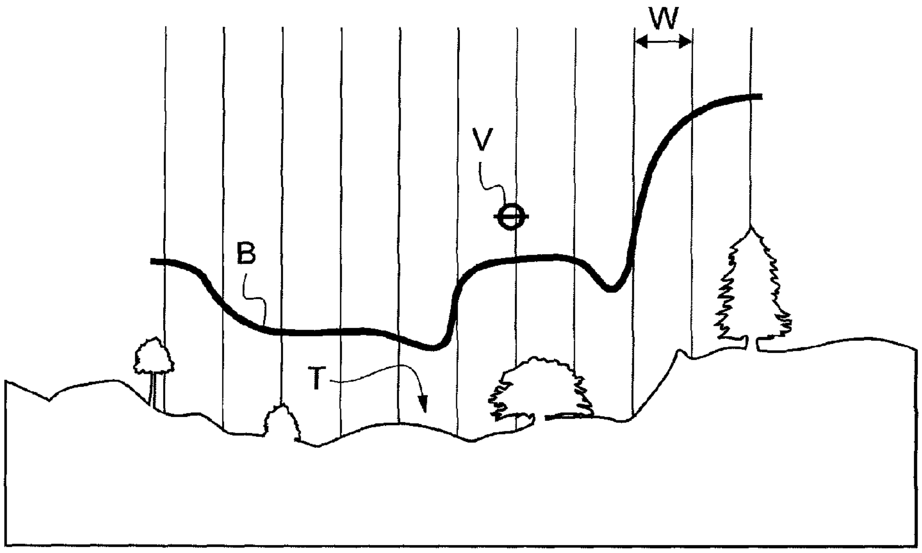
FIG. 4 shows another example of a sensor security cordon constructed using the method in accordance with the invention and displayed on a screen, said cordon being constructed from measurements performed by an active telemeter sensor.

FIG. 4 shows another example of a sensor safety cordon B constructed using the method of the invention and displayed on a screen. The sensor safety cordon B is constructed by this technical method from measurements taken by an active telemeter sensor A. By way of example, this sensor is a Lidar or a Radar telemeter. Other detectors of obstacles in three dimensions are used in implementations of the invention. The sensor safety cordon B makes it possible to come as close as possible to the terrain T and obstacles.

Figure 5:
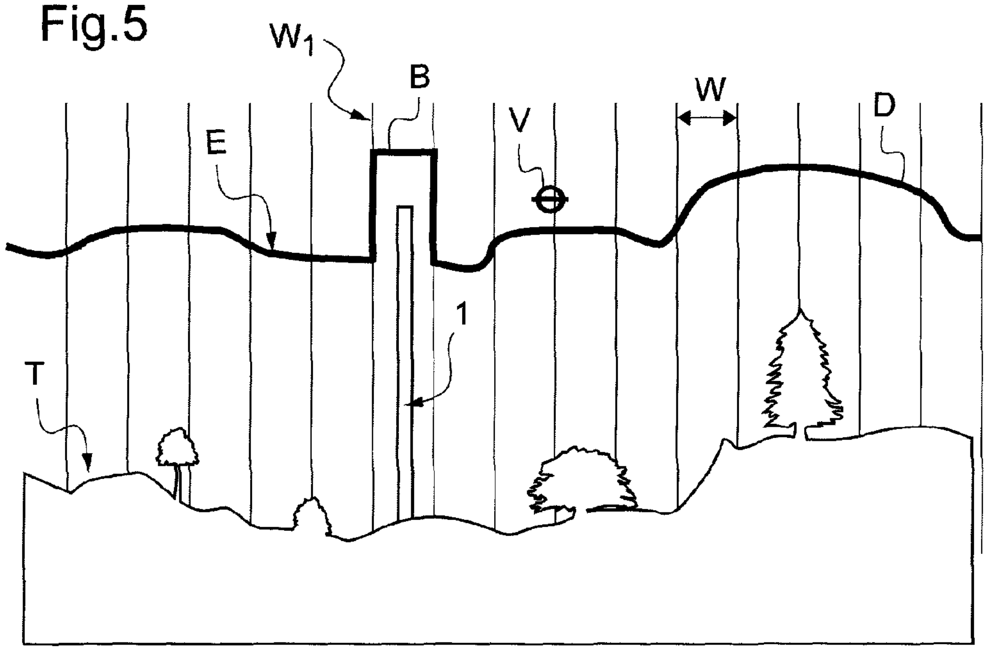
FIG. 5 shows another example of a hybrid safety cordon constructed using the method in accordance with the invention and displayed on a screen, said cordon being constructed from at least one terrain and obstacles database together with and/or modified by, where appropriate, information from the active telemeter sensor.

FIG. 5 shows an example of a hybrid safety cordon E, constructed using the method of the invention and displayed on a screen. The hybrid safety cordon E is constructed from at least one terrain database C and obstacles database C', together with and/or modified by information from the active telemeter sensor A, where appropriate. This active telemeter sensor A may detect, for example, a mast 1 in an angular sector w1 and the method of the invention raises the terrain safety cordon D in this angular sector w1. For the method of the invention, this amounts to replacing, in the angular sector w1 in question, the terrain safety cordon D by the sensor safety cordon B. By way of example, this corresponds to circumstances in which obstacles are not listed in the databases C and C'.

The angular sectors w and w1 defined and calculated by the method of the invention are shown in FIG. 5 only for explanatory purposes in order to understand how a cordon is constructed, and they are not displayed on a screen in implementations of the invention.

The operations of modifying or adding to the databases C and C', or alternatively of replacing a portion of terrain safety cordon D in certain angular sectors w1 with a sensor safety cordon B are performed by a mission computer managing the database (whether certified or not). The mission computer is incorporated in the on-board avionics system.

In the absence of terrain data for one or more angular sectors w, the terrain safety cordon D is added to in the method of the invention by using information from the active telemeter sensor A, if available. If one of the FORs for one of the safety cordons B and D is greater than the other, then it is the greater safety cordon that is displayed in the corresponding angular sectors w. The pilot thus has a default safety cordon in some of the angular sectors w.

In the M1 mode of operation, which displays the terrain safety cordon D, an advantage is that the invention does not make use of the active telemeter sensor A, which might deliver false echoes under certain circumstances and which is detectable.

Figure 6:
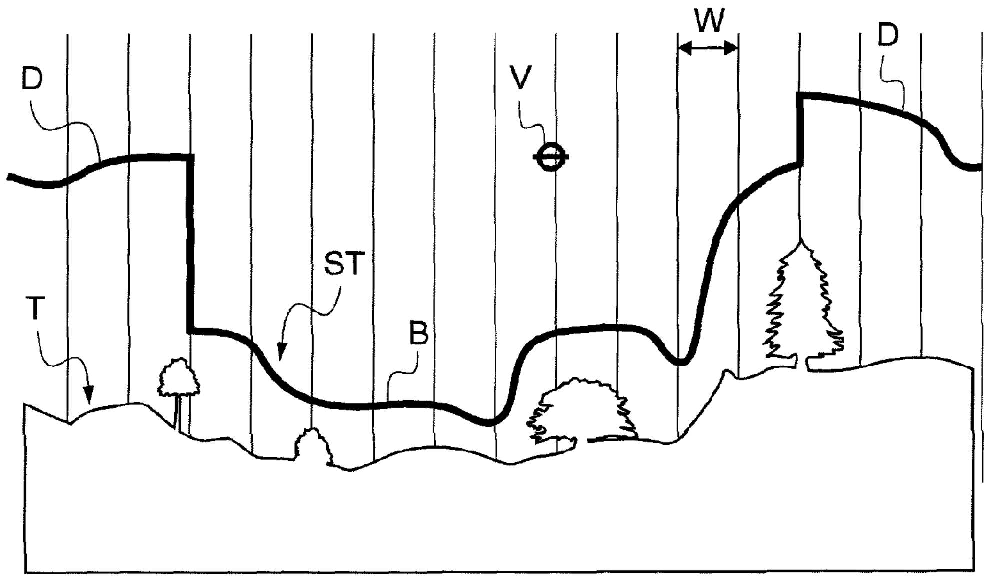
FIG. 6 shows another example of a hybrid cordon for terrain tracking constructed using the method in accordance with the invention and displayed on a screen, said cordon being constructed from the sensor safety cordon of FIG. 4 and the terrain safety cordon of FIG. 3.

FIG. 6 shows an example of a hybrid terrain-tracking cordon ST constructed using the method in accordance with the invention and displayed on a screen. The hybrid terrain-tracking cordon ST is constructed from the sensor safety cordon B of FIG. 4 and the terrain safety cordon D of FIG. 3. It can clearly be seen that the FOR for the active telemeter sensor A does not cover all of the angular sectors w that are covered by the terrain safety cordon D. It is therefore the terrain safety cordon that is displayed outside the FOR of the active telemeter sensor A. The sensor safety cordon B that is closer to the terrain is displayed as a priority, and in the event of information from the active telemeter sensor A being absent or lost, then it is the terrain safety cordon D that is displayed.

Naturally, the present invention may be subjected to variants in addition to the implementations described.

What is claimed is:

1. A piloting assistance method for an aircraft, the method comprising:

defining and calculating angular sectors (w) over a field of regard (FOR) facing the aircraft using positioning system information indicative of position of the aircraft;

constructing a sensor safety cordon (B) indicative of an altitude contour above terrain and obstacles in the angular sectors (w) over the field of regard (FOR) using data from an active telemeter sensor (A), using the positioning system information indicative of the position of the aircraft, and using positioning system information indicative of altitude of the aircraft and without using data from a terrain database (C);

constructing a terrain safety cordon (D) indicative of an altitude contour above terrain and obstacles in the angular sectors (w) over the field of regard (FOR) using data from the terrain database (C) including data from an obstacles database (C') of the terrain database (C) and using the positioning system information indicative of the position of the aircraft and without using data from the active telemeter sensor (A);

constructing a hybrid safety cordon (E) that for each of the angular sectors (w) over the field of regard (FOR) makes use of the higher altitude contour of the sensor and terrain safety cordons (B, D) in the respective angular sector (w); and displaying on a screen for presentation to the pilot one of the cordons selected from: the hybrid safety cordon (E), the terrain safety cordon (D), and the sensor safety cordon (B).

2. A method according to claim 1, further comprising:

when one of the sensor safety cordon (B) and the terrain safety cordon (D) is corrupted, selecting the other one of the sensor safety cordon (B) and the terrain safety cordon (D) for displaying on the screen for presentation to the pilot.

3. A method according to claim 1, wherein the method further includes displaying a hybrid terrain-tracking cordon (ST), said hybrid terrain-tracking cordon (ST) being constructed for a given angular sector (w) over the field of regard (FOR) using the terrain safety cordon (D) in the event of measurements from the active telemeter sensor (A) being absent or lost for the given angular sector (w) or in the event of the given angular sector (w) not being covered by said active telemeter sensor (A).

4. A method according to claim 1, wherein the method further includes verifying the operating state of locating means and the integrity of the terrain database (C) used for establishing the terrain safety cordon (D), for verifying the operating state of the active telemeter sensor (A) and of a GNSS/AHRS system used for establishing the sensor safety cordon (B), for displaying on the screen only the sensor safety cordon (B) in the event of a failure of the locating means or of corruption of the terrain database (C), and for outputting a terrain alarm in the event of a failure of the locating means or corruption of the terrain database (C) together with a failure of the active telemeter sensor (A).

5. A method according to claim 1, wherein the method further includes verifying the operating state of locating means and the integrity of the terrain database (C) used for establishing the terrain safety cordon (D), for verifying the operation of the active telemeter sensor (A) and of a GNSS/AHRS system used for establishing the sensor safety cordon (B), and for displaying on the screen only the terrain safety cordon (D) in the event of the active telemeter sensor (A) or the GNSS/AHRS system failing.

6. A method according to claim 1, wherein the method further includes using a state vector (VE) representing information coming from on-board navigation sensors, in order to construct the terrain safety cordon (D) and the sensor safety cordon (B).

7. A method according to claim 1, wherein the method further includes displaying on the screen a speed vector (V) symbolizing the aircraft and the position of the aircraft relative to the displayed cordon.

8. A method according to claim 7, wherein the method further includes constructing a predictive three-dimensional path for following terrain by using a simulated state vector (VE'), the terrain database (C), and a two-dimensional route plotted by the pilot.

9. A method according to claim 8, wherein the method further includes storing the three-dimensional path together with data relating to the terrain derived from the simulation in such a manner as to cause said path to be followed by an autopilot system.

10. A method according to claim 9, wherein the method further includes displaying on the screen the terrain safety cordon (D) or the hybrid safety cordon (E) as constructed in real time from the terrain database (C) and the measurements from the active telemeter sensor (A) in order to verify proper operation of the autopilot system.

* * * * *